(12) United States Patent
Botosan et al.

(10) Patent No.: US 6,357,228 B1
(45) Date of Patent: Mar. 19, 2002

(54) SLEEVELESS SUPPORT OF PUMP GEAR DRIVE

(75) Inventors: Valentin Botosan, Rochester; Thomas D. Nogle, Troy; Berthold Martin, Shelby Township, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/282,990

(22) Filed: Mar. 31, 1999

(51) Int. Cl.7 .............................................. F16D 33/00
(52) U.S. Cl. .......................................... 60/330; 60/358
(58) Field of Search ........................... 60/330, 358, 360

(56) References Cited

U.S. PATENT DOCUMENTS

| | | |
|---|---|---|
| 3,752,010 A | 8/1973 | Tipping |
| 3,916,727 A | 11/1975 | Piret |
| 3,953,970 A | 5/1976 | Fuehrer et al. |
| 4,011,775 A | 3/1977 | Ahlen |
| 4,037,687 A | 7/1977 | Krutz et al. |
| 4,376,370 A | 3/1983 | Kinugasa et al. |
| 4,785,682 A | 11/1988 | Nishimura et al. |
| 4,875,391 A | 10/1989 | Leising et al. |
| 4,903,548 A | 2/1990 | Hayakawa et al. |
| 4,936,757 A | 6/1990 | Kambe et al. |
| 5,013,287 A | 5/1991 | Hayakawa et al. |
| 5,120,283 A | 6/1992 | Bogdan |
| 5,269,649 A | 12/1993 | Kiefer et al. |
| 5,392,603 A | 2/1995 | Havens et al. |
| 5,522,476 A | 6/1996 | Holman |
| 5,761,959 A | 6/1998 | Winter |

FOREIGN PATENT DOCUMENTS

SU 620726 * 8/1978 .................. 60/330

* cited by examiner

*Primary Examiner*—F. Daniel Lopez
(74) *Attorney, Agent, or Firm*—Mark P. Calcaterra

(57) ABSTRACT

The present invention provides a torque converter support for an automatic transmission which uses a driving gear of a fluid pump to support the torque converter. The driving gear is supported by a journal area of the fluid pump. The torque converter impeller hub, attached to the torque converter, is engaging the driving gear and has at least one rib therearound. A hollow bore of the driven gear rides against the rib, offering structural support to the torque converter impeller hub and torque converter. The driven gear also has a hub. The hub has an outer surface which rides against the journal area and provides the base support for the system.

15 Claims, 2 Drawing Sheets

SLEEVELESS SUPPORT OF PUMP GEAR DRIVE

BACKGROUND OF THE INVENTION

I. Technical Field

The present invention relates to a support for a torque converter of an automatic transmission, and more particularly to a support for a torque converter impeller hub of an automatic transmission which does not require a support bearing.

II. Discussion

In traditional automatic transmissions, an input sleeve from the torque converter called an impeller hub, provides piloting and support for the torque converter and also provides the required rotational energy to drive the pump drive gear, which is splined to the torque converter input sleeve. The pump, in turn, uses this rotational energy to generate flow and pressure which is supplied to a system of valves for controlling cooling and gear shifting. The pump housing also acts to support the torque converter and maintain its position while under gravitational and centrifugal loads. Since the torque converter impeller hub, which supports the torque converter, rotates relative to the pump housing, a needle or roller bearing is typically positioned between these elements to allow support of the torque converter while reducing frictional loss and wear due to this relative movement.

However, the cost of bearings, including purchase or manufacturing and installation, is typically high. As such, this added element increases the overall cost of the transmission. It is also a source of noise. In an attempt to eliminate the use of a bearing element between the impeller hub and the pump housing, a bushing has been used in place of the bearing as a frictional wear element. However, similar to the bearing, the bushing adds an extra element to the transmission thereby increasing its overall cost. Moreover, the bushing tends to wear, creating maintenance and repair problems in the transmission. The present invention was developed in light of these drawbacks.

SUMMARY OF THE INVENTION

The present invention overcomes the aforementioned drawbacks, among others, by providing a torque converter support for an automatic transmission which uses a driving gear of a fluid pump to support the torque converter impeller hub. The driving gear is piloted and supported via the journal area in the pump housing. The torque converter impeller hub which is attached to the torque converter, is splined to the driving gear and has at least one rib therearound. A hollow bore of the drive gear rides against the rib, offering radial support to the torque converter impeller hub and torque converter. The drive gear also has a hub. The drive gear hub has an outer surface which forms the journal for the drive gear and it rides against the bore in the pump housing which provides the base support for the system.

Additional advantages and features of the present invention will become apparent from the subsequent description and the appended claims taken in conjunction with the accompanying drawings.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
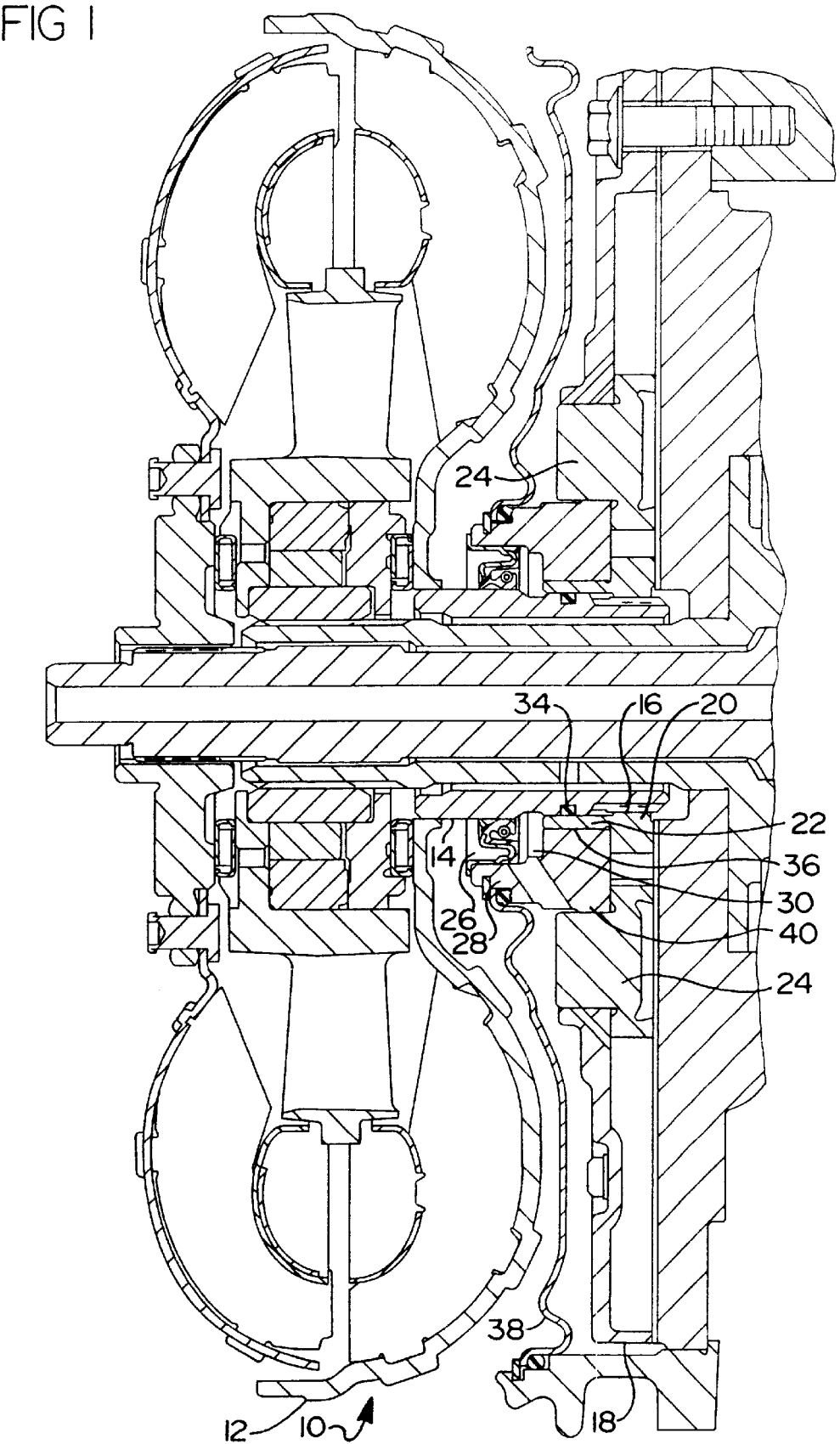
FIG. 1 is a cross sectional view of a transmission using a sleeveless support according to the present invention.

Referring now to FIG. 1, an automatic transmission 10 according to the present invention is shown and described. In automatic transmission 10, a torque converter 12 supplies rotational energy to torque converter impeller hub 14 which is, in tun, splined to driving gear 16 of the transmission pump. Driving gear 16 has a teeth portion 20 and a hub portion 22. Teeth portion 20 engages driven gears 24, thereby transmitting rotational energy from torque converter 12 to driven gears 24. This rotation provides the required pressurization of transmission fluid within the transmission pump to supply transmission fluid to all the critical components of automatic transmission 10.

Fluid seal 26 is positioned between transmission pump at area 28 and torque converter impeller hub 14 to prohibit transmission fluid or other lubricant from escaping from the transmission pump to outside barrier 38. To maintain pressure within the transmission pump, O-Ring seal 34 is positioned between hub portion 22 of driving gear 16 and torque converter impeller hub 14.

Figure 2:
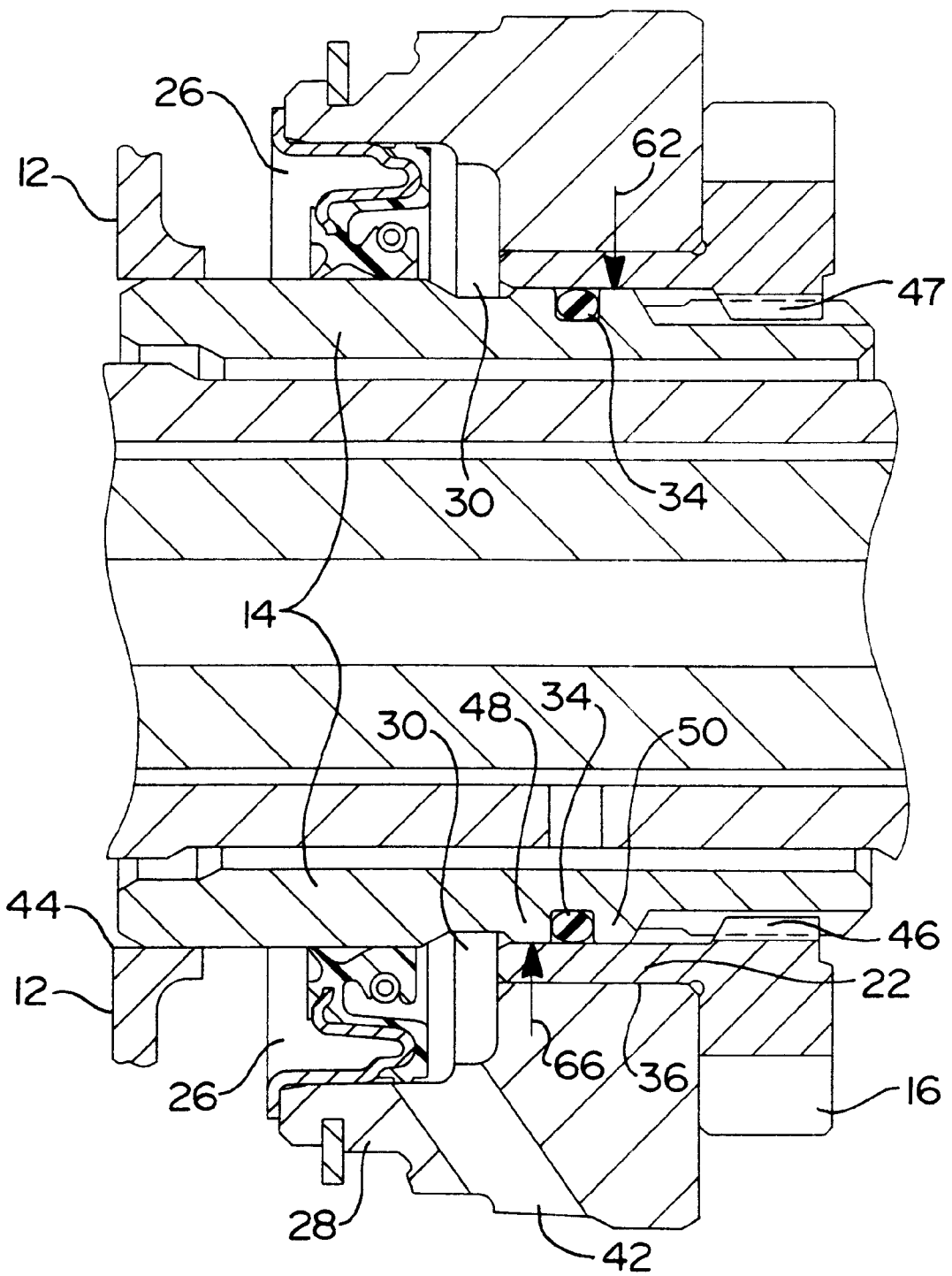
FIG. 2 is a cross sectional view of a sleeveless support according to the present invention.

With reference to FIG. 2, the hub portion 22 of driving gear 16 and torque converter impeller hub 14 are shown in greater detail. Hub portion 22 of driving gear 16 is preferably a cylindrical metal portion, the cross section of which is shown in FIGS. 1 and 2, which separates journal pilot and support area 40 of transmission pump 18 from torque converter impeller hub 14. Hub portion 22 provides a mechanical interface between torque converter impeller hub 14 and transmission pump housing 18 to serve the dual function of supporting torque converter 12 and allowing driving gear 16 to rotate. Journal pilot and support area 36 is preferably constructed of wear resistant material and is an integral part of the transmission pump housing 18. Moreover, journal pilot and support area 36 has passage 42 to facilitate flow of lubricant from channel 30 down between transmission pump housing 18 and barrier 38 (as will be discussed).

As may be seen in FIG. 2, torque converter impeller hub 14 is attached to torque converter 12 at area 44 and is splined to driving gear 16 at teeth 46 and 47. Ribs 48 and 50 provide two points of contact between driving gear 16 and torque converter impeller hub 14 to support the cantilevered weight of torque converter 12. A load exerted by the torque converter 12 is reacted at ribs 48 and 50 which act as pivot points. It is noted that one rib, covering the span of ribs 48 and 50, could be used instead of two ribs to provide the required pivot point support of ribs 48 and 50. No radial load is exerted on the driving gear 16 at teeth 46 due to the support provided by ribs 48 and 50. This acts to avoid inducing a thrust load onto the driving gear 16 from the axial motion of the torque converter 12 and friction at the contact points 46.

In operation, torque converter 12 supplies rotational energy to driving gear 16, through torque converter impeller hub 14, for the pressurization of transmission fluid within the transmission pump. Since torque converter impeller hub 14 is splined to driving gear 16, hub portion 22 rotates with torque converter impeller hub 14. However, since transmission pump housing 18 remains rotationally fixed, as is known, by automatic transmission 10, hub portion 22 rotates with respect to area 36. The forces 62 and 66 will have a net effect of inducing radial force on surface 36. Moreover, this force creates compression forces between hub portion 22 and journal pilot and support area 36, which is the interface between the rotating elements and the non rotating elements. As such, lubrication between these elements becomes important. Pressurized transmission fluid from within transmission pump housing 18 leaks through this interface and into channel 30. From here, transmission fluid travels down passage 42 and returns back into the transmission pump (not shown but well known in the art). The resultant forces 62 and 66 ensure that torque converter 12 is supported.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A torque converter support for an automatic transmission said support comprising:
   a fluid pump housing;
   a driving gear supported by said fluid pump housing, said driving gear being rotatable about an axis, said driving gear having a support surface;
   an input member in rotational engagement with said driving gear, the input member being slidingly supported on said support surface of said driving gear; and
   a torque converter in rotational engagement with said input member to rotate about said axis, wherein said fluid pump housing provides direct bearingless mechanical support for said driving gear.

2. A torque converter support as claimed in claim 1, wherein said input member having at least one elevated rib, said elevated rib being located on an outer surface of said input member, said elevated rib being in physical contact with said support surface of said driving gear.

3. A torque converter support as claimed in claim 2, wherein said driving gear pilots said input member with said at least one elevated rib.

4. A torque converter support as claimed in claim 2, wherein said input member and said torque converter are partially supported by said at least one elevated rib.

5. A torque converter support as claimed in claim 4, wherein said input member has two elevated ribs spaced apart along said outer surface of said input member.

6. A torque converter support as claimed in claim 1, wherein said fluid pump housing further includes a journal portion, said fluid pump housing supporting said driving gear with said journal portion.

7. A torque converter support as claimed in claim 6, wherein said driving gear further comprises a hub, said hub riding in said journal portion.

8. A torque converter as claimed in claim 7, wherein said hub extends substantially a length of said journal portion.

9. A torque converter support as claimed in claim 7, wherein an interface between said journal portion and said driving gear is lubricated by pressurized transmission fluid from within said fluid pump housing.

10. A torque converter support as claimed in claim 1, wherein said input member is an impeller hub.

11. A torque converter support as claimed in claim 10, wherein said impeller hub has two ribs, said two ribs journaling an O-Ring.

12. A torque converter support for an automatic transmission, comprising:
    a torque converter impeller hub having a first end and a second end, said torque converter impeller hub attached to a torque converter at a fist end, said torque converter impeller hub having a pair of ribs positioned along an outer surface of said torque converter impeller hub, said outer surface having a portion forming a support surface;
    a fluid pump housing; and
    a driving gear having a hub and a hollow bore being rotationally engaged to said second end, wherein said fluid pump housing provides direct bearingless mechanical support for said driving gear, said pair of ribs of said torque converter impeller hub slidingly piloted on said support surface of said hollow bore, said pair of ribs supporting said torque converter impeller hub to allow said torque converter impeller hub and said driving gear to rotate about one axis of rotation.

13. A torque converter support as claimed in claim 12, further including an automatic transmission, said automatic transmission supporting said fluid pump housing.

14. A torque converter support as claimed in claim 12, wherein said fluid pump housing further comprises a journal portion supporting said driving gear.

15. A torque converter support as claimed in claim 14, further wherein said driving gear hub rides in and is supported by said journal portion.

* * * * *